United States Patent [19]

Takahashi et al.

[11] Patent Number: 4,728,976
[45] Date of Patent: Mar. 1, 1988

[54] SYSTEM FOR CONTROLLING FILM TRANSPORT FOR CAMERA

[75] Inventors: Akira Takahashi, Kawasaki; Shinichiro Koshiishi, Hachioji, both of Japan

[73] Assignee: Ricoh Company, Ltd., Tokyo, Japan

[21] Appl. No.: 939,689

[22] Filed: Dec. 9, 1986

[30] Foreign Application Priority Data

Dec. 28, 1985 [JP] Japan ................................ 60-299243

[51] Int. Cl.⁴ ........................... G03B 1/12; G03B 1/60
[52] U.S. Cl. .................................. 354/173.11; 354/217
[58] Field of Search ............................. 354/173.11, 217

[56] References Cited

U.S. PATENT DOCUMENTS 4,643,552 2/1987 Takahashi ........................... 354/217

Primary Examiner—Michael L. Gellner
Attorney, Agent, or Firm—Oblon, Fisher, Spivak, McClelland & Maier

[57] ABSTRACT

A film transport control system in a camera, including a central processing unit programmed to control a film transport motor to transport film for one frame and also to start operating a liquid crystal display unit in response to a signal intermittently generated by a one-frame feed switch actuated in timed relation to movement of the film in the camera. The central processing unit issues a film rewinding failure warning if a predetermined number of signals are not supplied by the one-frame feed switch within a preset period of time from the time when the film starts being rewound. The time when signals are no longer applied by the one-frame feed switch for a predetermined period of time is regarded as a film rewinding completion time by the central processing unit if a predetermined number of signals or more are applied by the one-frame feed switch when the film starts to be rewound.

1 Claim, 10 Drawing Figures

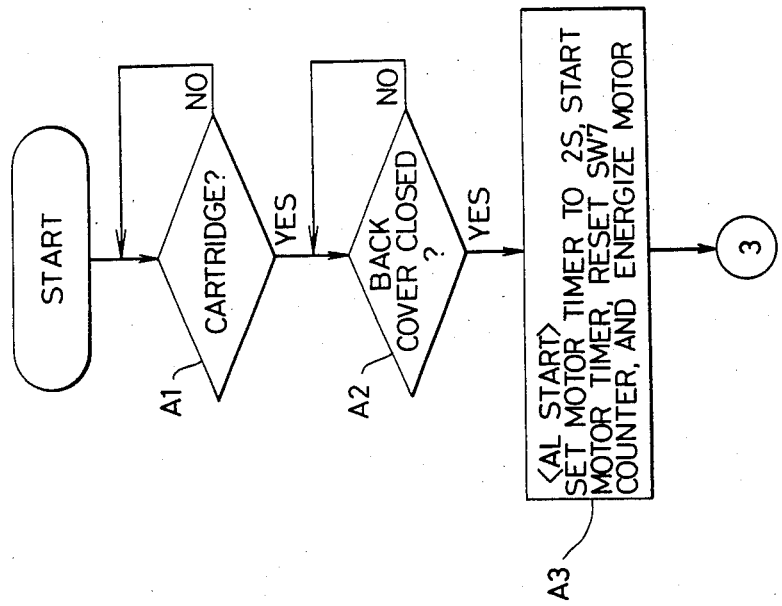

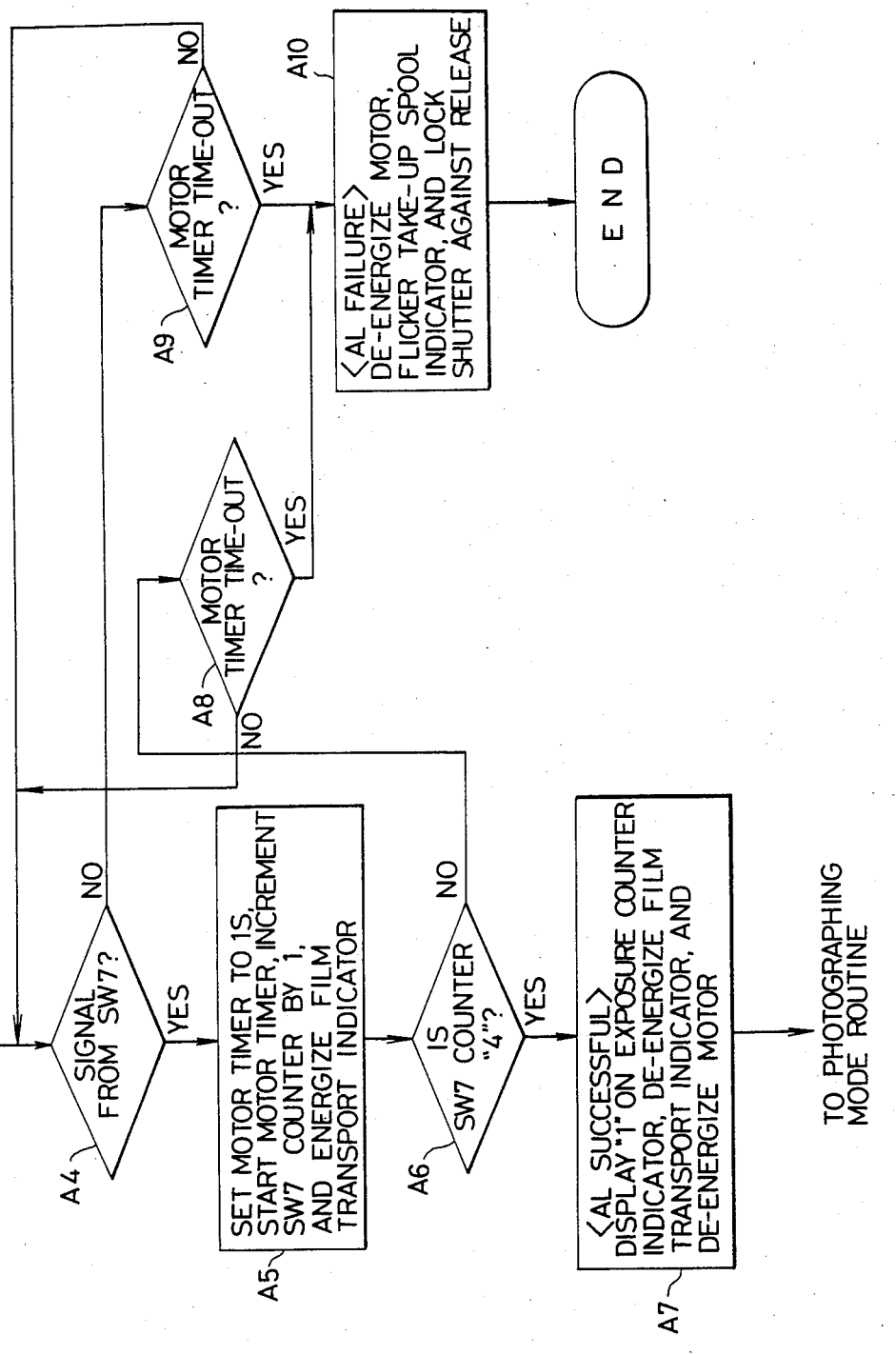

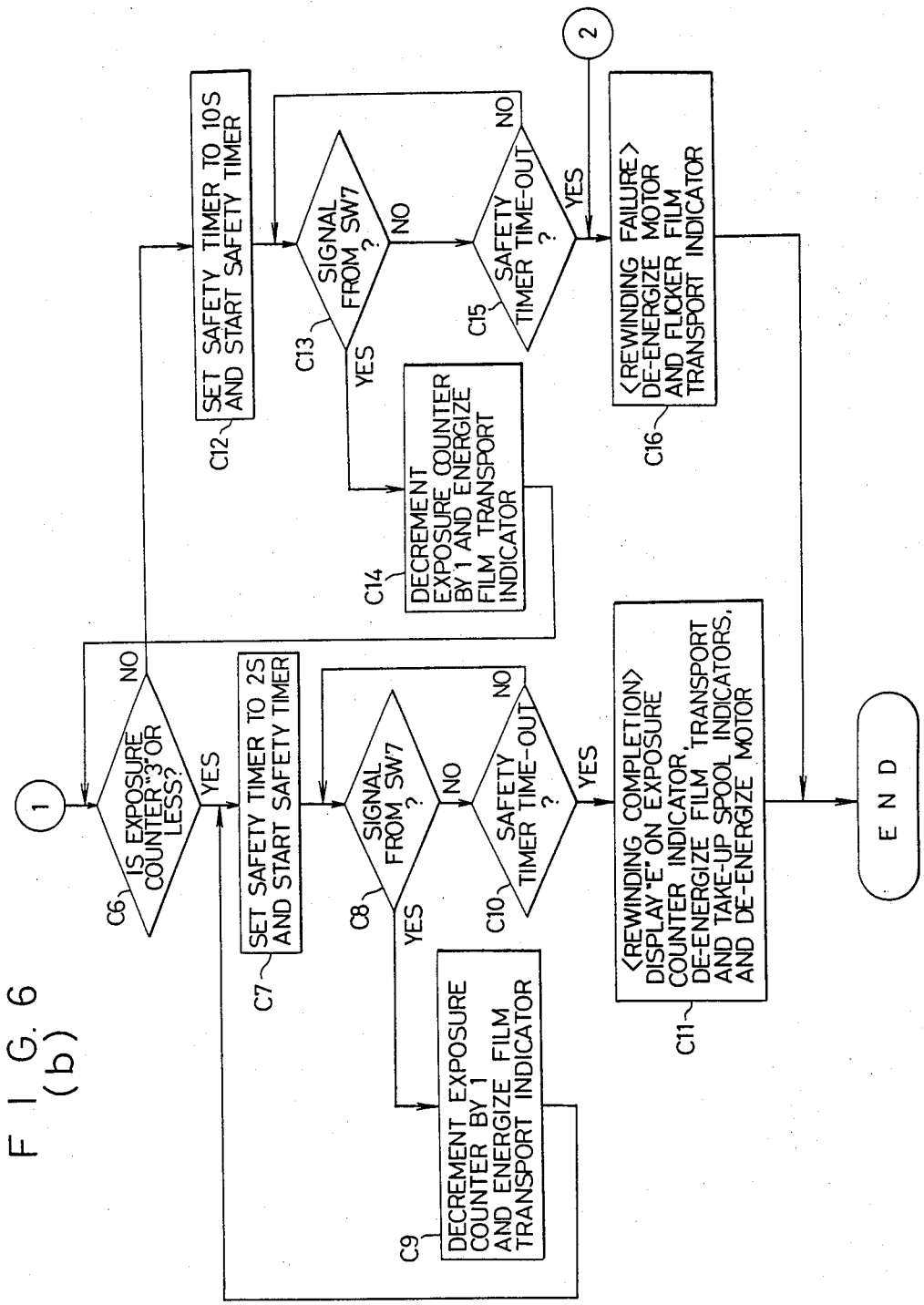
F I G. 6 (b)

SYSTEM FOR CONTROLLING FILM TRANSPORT FOR CAMERA

BACKGROUND OF THE INVENTION

1. Field of the Invention

The present invention relates to a system for controlling the transport of a film for a camera.

2. Description of Background

Some conventional film transport control systems for use in cameras are of high cost and low reliability since they employ many switches for applying signals of various detected conditions to a central processing unit.

FIG. 7 of the accompanying drawings illustrates a conventional film transport control system for use in a camera. The film transport control system generally comprises a microcomputer or central processing unit (CPU) 1, a shutter unit 2, a liquid crystal display unit 3, and a group of switches. The group of switches includes a one-frame fed switch SW1 having a movable contact actuatable by a mechanism (not shown) into contact with fixed terminal c upon completion of operation of the shutter and into contact with another fixed terminal d when one film frame is fed, a perforation switch SW2 that can be closed by each film perforation when the film is transported by a mechanism (not shown), wind-/rewind changeover switches SW3a, SW3b actuatable by a mechanism (now shown) into the illustrated position when the back cover of the camera is opened and into the other position when the terminal film end is reached, i.e. when all of the film frames are exposed, a film detector switch SW4 for detecting whether the film has been fuly rewound in the film cartridge, a cartridge detector switch SW5 for detecting whether there is a film cartridge in the camera, and a back cover switch SW6 for detecting whether the back cover of the camera is opened or closed. The film transport control system additionally includes a film transport motor M for winding and rewinding the film, a DC power supply B, and resistors R1, R2, R3. The liquid crystal display unit 3 has a cartridge indicator 4, a film transport indicator 5, a take-up spool indicator 6, and an exposure counter indicator 7.

Film can automatically be loaded in the camera under the control of the film transport control system, as next described. When the film cartridge is placed in the camera and the back cover of the camera is closed, the cartridge detector switch SW5 and the back cover SW6 are closed. Based on signals from these switches SW5, SW6, the CPU 1 detects when the film cartridge is put in the camera and the back cover is closed, and applies a shutter release pulse to the shutter unit 2 to energize a shutter release magnet (not shown) for thereby releasing the shutter. Upon completion of the shutter release, the movable contact of the one-frame feed switch SW1 contacts the fixed terminal c to energize the film transport motor M to rotate in a forward direction to wind the film. When one frame of the film is fed, the movable contact of the one-frame feed switch SW1 is moved into contact with the fixed terminal d for electromagnetically braking the motor M until it is stopped. A signal is then applied from one terminal of the motor M to an input port e of the CPU 1, which detects the stoppage of the motor M and applies a shutter release pulse to energize the shutter release magnet to release the shutter again. The above cycle is repeated four times to wind the film for four frames, whereupon the automatic film loading operation is completed. The perforation switch SW2 is repeatedly turned on and off in timed relation to the film transport thus affected. For example, the perforation switch SW2 is turned on and off eight times per film frame. The CPU 1 frequency-divides by 2 the signal from the perforation switch SW2 into a signal having a half frequency, and the frequency-divided signal is applied to the film transport indicator 5 to energize a plurality of indicator elements 51 through 54 thereof successively.

The following discussion describes how it is determined whether or not the automatic film loading is successively effected. Perforation pulses are generated by the perforation switch SW2 when the fourth shutter release pulse is applied by the CPU 1 to the shutter unit 2. If seven or more perforation pulses are generated, then the CPU 1 determines that the automatic film loading procedure has been successful. The CPU 1 then energizes the take-up spool indicator 6 and at the same time displays "1" on the exposure counter indicator 7. If, however, only six or less perforation pulses are produced, then the CPU 1 determines that the automatic film loading process has been unsuccessful. The CPU 1 now causes the take-up spool indicator 6 to flicker, giving the user a loading failure warning, and locks the shutter from being released to protect the film against undesired exposure.

When a shutter release button is pressed, the CPU 1 applies a shutter release pulse to the shutter unit 2 to release the shutter and at the same time increments the count on the exposure counter indicator 7 by 1. Upon completion of the shutter release, the non-frame feed switch SW1 is shifted to the terminal c to rotate the film transport motor M in the forward direction, winding the film. After the film is advanced for one frame, the one-frame feed switch SW1 is shifted to the terminal d to stop the motor by electromagnetic braking. At this time, perforation pulses are produced by the performation switch SW2 in timed relation to the advancing movement of the film, and the CPU 1 frequency-divides the produced perforation pulses by 2. The frequency-divided pulses are applied to the liquid crystal display unit 3 for sequential energization of the indicator elements 51 through 54. Such sequential energization may be repeated, for example, in three successive cycles to allow the user to confirm that the film has properly been transported even after the winding of the film.

The film transport process and the indications on the display unit 3 are repeated as the film frames are exposed. When the terminal end of the film reaches the aperture in the camera, i.e., when all of the film frames are exposed, the wind/rewind changeover switches SW3a, SW3b are changed over to reverse the film transport motor M to rewind the exposed film. At this time, too, the CPU 1 frequency-divides perforation pulses from the perforation switch SW2 by 2 and applies the frequency-divided pulses to energize the indicator elements 51 through 54 successively. Each time eight perforation pulses are applied, the CPU 1 decrements the count on the exposure counter indicator 7 by 1.

When the film has fully been rewound into the cartridge, the film detector switch SW4 is opened to deenergize the film transport motor M to stop rewinding the film. The signals at both terminals of the film transport motor M go high in level, and such a high level is detected by the CPU 1, which then displays "E" on the exposure counter indicator 7 to apprise the user of the completion of the find rewinding process.

The conventional film transport control system shown in FIG. 7 is however disadvantageous in that it employs many switches, i.e., the one-frame feed switch SW1, the perforation switch SW2, the wind/rewind changeover switches SW3a, SW3b, the film detector switch SW4, the cartridge detector switch S5, and the back cover switch SW6, and hence is high in cost and low in reliability.

SUMMARY OF THE INVENTION

It is an object of the present invention to provide a film transport control system for a camera, having a reduced number of switches.

Another object of the present invention is to provide a film transport control system for a camera, which can prevent erroneous detection of the completion of film rewinding, which would arise from loosening of the film, from taking place.

According to the present invention, there is provided a system for controlling film transport in a camera, comprising a film transport motor for transporting a film, a display means for displaying a condition in which the film is transported, a signal generating means for intermittently generating a signal in timed relation to movement of the film, and a control means responsive to a signal supplied from the signal generating means and indicative of one film frame for controlling the film transport motor to transport the film for one frame, and also for starting to operate the display means.

According to the present invention, there is also provided a system for controlling film transport in a camera, comprising a film transport motor for transporting a film, an alarm, a signal generating means for intermittently generating a signal in timed relation to movement of the film, and a control means responsive to the signal supplied from the signal generating means for controlling the film transport motor to wind or rewind the film, for energizing the alarm to give a film rewinding failure warning if a predetermined number of signals are not supplied by the signal generating means within a preset period of time from the time when the film starts being rewound, and for regarding, as a film rewinding completion time, the time when signals are no longer applied by the signal generating means for a predetermined period of time if at least a predetermined number of signals are applied by the signal generating means when the film starts to be rewound.

With the arrangement of the present invention, the number of switches used is reduced since the film transport for successive frames is controlled by the signal that is intermittently produced in timed relation to movement of the film. If a predetermined number of signals are not supplied to the control means by the signal generating means within a preset period of time from the time when the film starts being rewound, the control means issues a film rewinding failure warning. If the signal generating means applies a predetermined number of signals or more signals to the control means at the time the film starts to be rewound, then the control means regards, as a film rewinding completion time, the time when signals are no longer applied by the signal generating means for a predetermined period of time. Therefore, the erroneous detection of completion of film rewinding due to loosening of the film in a film cartridge is prevented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 4(a), 4(b), 5, 6(a), and 6(b) are flowcharts of operation sequences of a central processing unit in the film transport control system of FIG. 2.

DESCRIPTION OF THE PREFERRED EMBODIMENTS

Figure 1A:
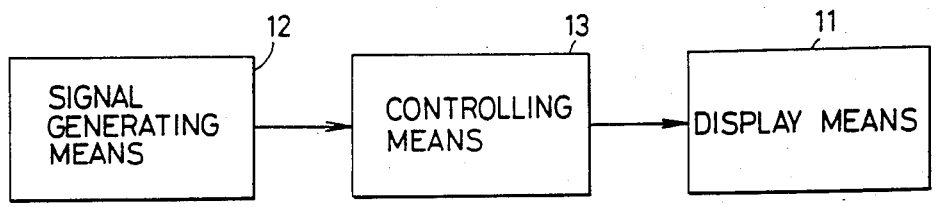
FIG. 1(a) is a block diagram of a film transport control system according to an embodiment of the present invention.

Referring now to the drawings, wherein like reference numerals designate identical or corresponding parts throughout the several views, FIG. 1(a) schematically shows a film transport control system according to an embodiment of the present invention. The film transport control system includes a display means 11, a signal generating means 12, and a control means 13. The signal generating means 12 intermittently generates a signal in timed relation to the movement of film in a camera. The control means 12 is responsive to a signal supplied from the signal generating means 12 and indicative of one film frame for controlling a film transport motor to transport the film for one frame, and also for enabling the display means 11 to start displaying the film transport.

Figure 1B:
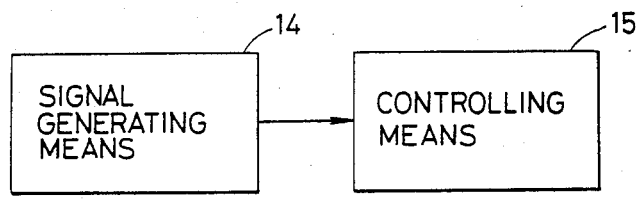
FIG. 1(b) is a block diagram of a film transport control system according to another embodiment of the present invention.

FIG. 1(b) schematically shows a film transport control system according to another embodiment of the present invention. The film transport control system includes a signal generating means 14 and a control means 15. The signal generating means 14 intermittently generates a signal in timed relation to the movement of film in a camera. The control means 15 is responsive to a signal supplied from the signal generating means 14 for controlling a film transport motor to wind or rewind film in a camera. In the event that a predetermined number of signals are not supplied to the control means 15 by the signal generating means 14 within a preset period of time from the time when the film starts being rewound, the control means 15 energizes an alarm means (not shown) to give the user a film rewinding failure warning. If the signal generating means 14 applies a predetermined number of signals or more signals to the control means 15 at the time the film starts to be rewound, then the control means 15 regards, as a film rewinding completion time, the time when signals are no longer applied by the signal generating means 14 for a predetermined period of time.

A film transport control system of the present invention will hereinafter be described in detail with reference to FIGS. 2 through 6.

Figure 2:
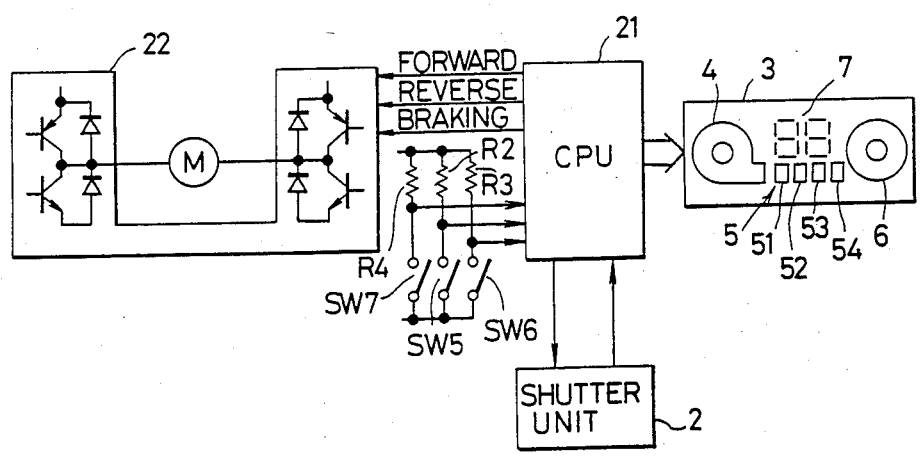
FIG. 2 is a detailed block diagram of a film transport control system of the present invention.

In FIG. 2, the film transport control system generally comprises a shutter unit 2, a liquid crystal display unit 3, a microcomputer or central processing unit (CPU) 21, a motor driver circuit 22, a cartridge detector switch SW5, a back cover switch SW6, a one-frame feed switch SW7, and resistors R2, R3, R4. The liquid crystal display unit 3 has a cartridge indicator 4, a film transport indicator 5 including indicator elements 51 through 54, a take-up spool indicator 6, and an exposure counter indicator 7.

Figure 3:
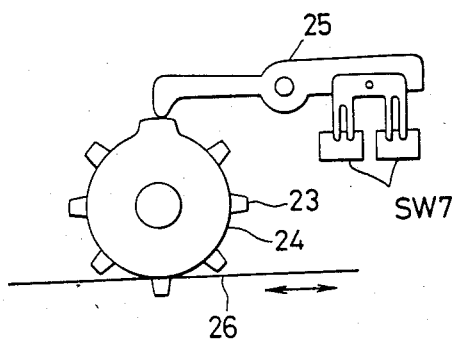
FIG. 3 is a front elevational view of a mechanism for driving a one-frame feed switch in the film transport control system shown in FIG. 2.
Figure 7:
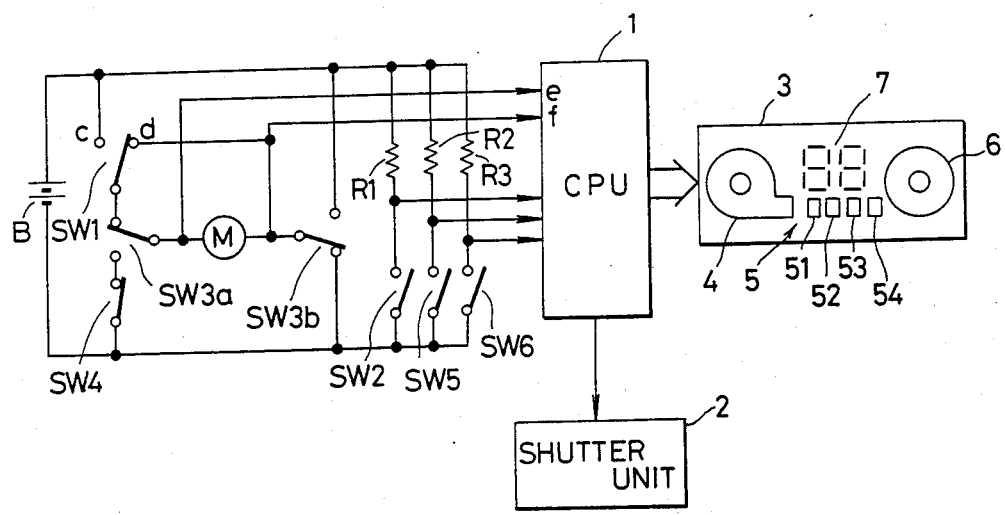
FIG. 7 is a block diagram of a conventional film transport control system.

As shown in FIG. 3, the one-frame feed switch SW7 can be actuated by a pivotable lever 25 which is angularly movable by a cam 24 integral with a free sprocket 23. The free sprocket 23 is rotatably supported and has a series of teeth on its outer periphery which engage in perforations in a film 26 between a film cartridge and a take-up spool. The cam 24 rotates with the sprocket 23 to make one revolution each time the film 26 is fed one frame, thus turning on the one-frame feed switch SW7 once.

The CPU 21 controls automatic loading (AL) of the film and detects whether such automatic loading is successful or not, according to the operation sequence shown in FIGS. 4(a) and 4(b). The CPU 21 checks a signal from the cartridge detector switch SW5 in a step A1 to ascertain whether a film cartridge is loaded in the camera. If a film cartridge is put in the camera, then the control sequence proceeds to a next step A2 to see if the back cover of the camera is closed. If the back cover is closed, then the control sequence proceeds to a step A3 which sets a motor timer to 2 seconds and starts the motor timer. The CPU 21 also resets a SW7 counter and applies a forward rotation signal to the motor driver circuit 22 in the step A3. The motor driver circuit 22 is responsive to the forward rotation signal for rotating a film transport motor M in a forward direction to wind the film. Then, a step A4 checks whether there is a signal supplied from the one-frame feed switch SW7. If no signal is supplied from the switch SW7, i.e., if the one-frame feed switch SW7 remains turned on, then control goes to a step A9 to check if the motor timer set to 2 seconds runs out. If the motor timer does not run out, then control returns to the step A4. If the time-out of the motor timer is reached in the step A9, meaning that the film has not been fed even after the film transport motor M was rotated in the forward direction for 2 seconds or more, then the CPU 21 determines that the automatic film loading has been unsuccessful. Control then goes from the step A9 to a step A10 in which the motor driver circuit 22 is controlled to energize the film transport motor M, the take-up spool indicator 6 of the liquid crystal display unit 3 is flickered to give the user a warning, and the shutter is locked against being released.

If a signal is applied by the one-frame feed switch SW7 in the step A4, then the control sequence proceeds to a step A5 in which the motor timer is set to 1 second and started, the SW7 counter is incremented by 1, and the indicator elements 51 through 54 are successively energized to indicate that the film is being transported. Thereafter, the CPU 21 ascertains in a step A6 whether the count of the SW7 counter is "4". If the count of the SW7 counter 7 has not reached "4", then the control sequence proceeds to a step A8 which checks if the 1 second time period being timed by the motor timer has expired. If the time-out of the motor timer has not been reached, then the control sequence returns from the step A8 to the step A4. If the motor timer runs out in the step A8, then the control sequence proceeds to the step A10. If the count of the SW7 counter has reached "4" in the step A6, then the CPU 21 determines that that the automatic film loading has been successful, and the control sequence proceeds to a step A7 in which the exposure counter indicator 7 displays "1", the film transport indicator 5 is de-energized, and the motor driver circuit 22 is controlled to de-energize the film transport motor M. Thereafter, the control sequence proceeds to a photographing mode routine, in which the CPU 21 applies a release pulse to the shutter unit 2 to release the shutter in response to depression of the shutter release button, and simultaneously increments the exposure counter by 1 and displays the sum on the exposure counter display 7.

Figure 5:
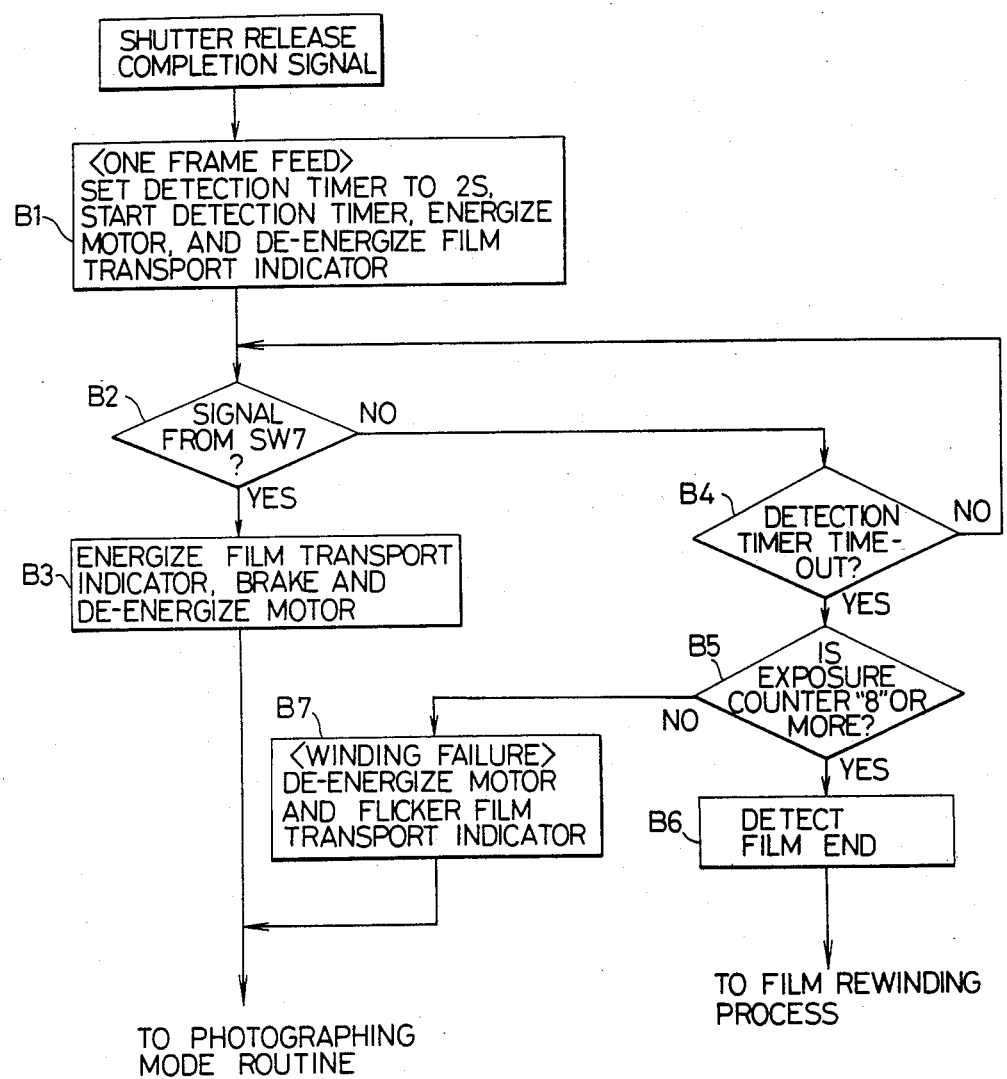

When a shutter release completion signal is applied by the shutter unit 2, as shown in FIG. 5, the CPU 21 sets a detection timer to two seconds and starts the same, enables the motor driver circuit 22 to rotate the film transport motor M in the forward direction, and de-energizes the film transport indicator 5, in a step B1. Then, the CPU 21 checks if there is a signal supplied from the one-frame feed switch SW7 in a step B2. If the one-frame feed switch SW7 changes from a turned-on condition to a turned-off condition because the film has started being transported, then control goes to a step B3 in which the indicator elements 51 through 54 of the film transport indicator 5 are successively energized in three successive cycles (or in one cycle). In the step B3, when the one-frame feed switch SW7 is turned on again, the film transport motor M is braked and de-energized. Thereafter, the control sequence proceeds from the step B3 to a next photographing mode routine. If the one-frame feed switch SW7 remains turned on in the step B2, then the control sequence proceeds proceeds to a step B4 to ascertain whether the 2 second time period timed by the detection timer has expired. If not run out, then control returns to the step B2. If the 2 second time-out of the detection timer is reached, then control goes to a step B5 that ascertains whether the count of the exposure counter is at least 8. If the count of the exposure count is at least 8, then the CPU 21 determines that the film 26 has been fully exposed, i.e., the terminal end of the film 26 has reached the aperture of the camera, in a step B6. The step B6 is thereafter followed by a film rewinding process. If the count of the exposure counter has not reached at least 8 in the step B5, then the control sequence proceeds to a step B7 in which the CPU 21 controls the motor driver circuit 22 to de-energize the film transport motor M and flickers the film transport indicator 5 to give the user a film winding failure warning.

Figure 6A:
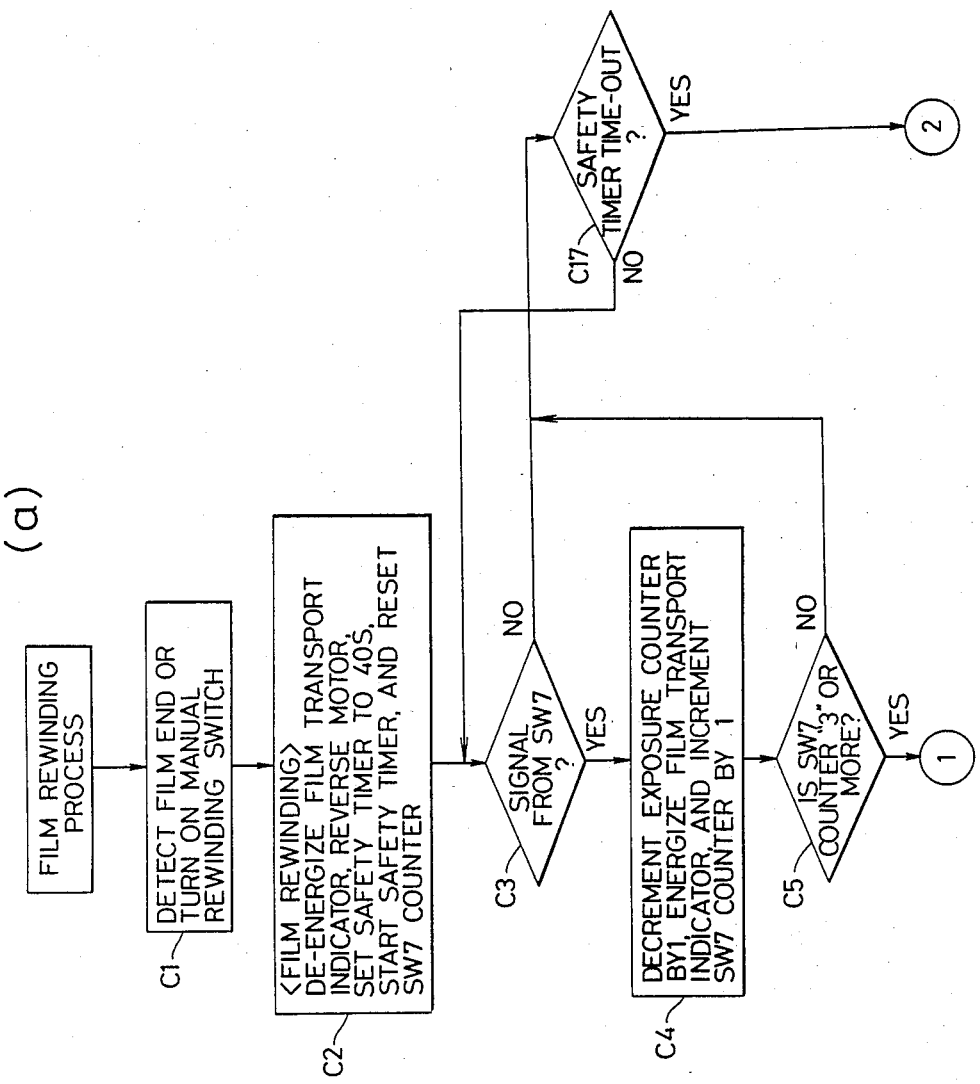

The film rewinding process will be described with reference to FIGS. 6(a) and 6(b). When the terminal end of the film 26 is detected or a manual rewinding switch is turned on in a step C1, the CPU 21 de-energizes the film transport indicator 5, enables the motor driver circuit 22 to reverse the film transport motor M to rewind the film 26, sets a safety timer to 40 seconds and starts the same, and resets the SW7 counter. At this time, where the film 26 is to be manually rewound, the manual rewinding switch is turned on in order to manually rewind the film. Thus, a signal from the manual rewinding switch is applied to the CPU 21. Step C3 is then performed, in which it is ascertained whether there is a signal from the one-frame feed switch SW7. If the one-frame feed switch SW7 is turned off, then step C4 is performed, in which the displayed count on the exposure counter indicator 7 is decremented by 1, the indicator elements 51 through 54 of the film transport indicator 5 are successively energized, and the SW7 counter is incremented by 1. Then, a step C5 checks the SW7 counter for its count. If the count of the SW7 counter is not "3" or more, then the control sequence proceeds to a step C17 which ascertains whether the safety timer set to 40 seconds has timed out. If the one-frame feed switch SW7 remains turned on in the step C3, then the control sequence also goes to the step C17. If the time-out of the safety timer is not reached in the step C17, then the control sequence returns to the step C3. If the safety timer runs out in the step C17, then the control sequence proceeds from the step C17 to a step C16 in which the motor driver circuit 22 is controlled to de-energize the film transport motor M and the film transport indicator 7 is flickered to give the user a film rewinding failure warning.

If the count of the SW7 counter is "3" or more in the step C5, then step C6 is performed to check the exposure counter for its count. If the count of the exposure counter is not "3" or less, then in a step C12 the safety timer is set to 10 seconds and started. The step C12 is followed by a step C13 which ascertains whether there is a signal from the one-frame feed switch SW7. If the one-frame feed switch SW7 remains turned on, then the control sequence proceeds to the step C16. If the one-frame feed switch SW7 is turned off, then the control sequence proceeds from the step C13 to a step C14 in which the count of the exposure counter is decremented by 1 to display the sum on the exposure counter indicator 7 and the indicator elements 51 through 54 of the film transport indicator 5 are successively energized. Thereafter, the control sequences returns to the step C6.

If the count of the exposure counter is "3" or less in the step C6, then control goes to a step C7 which sets the safety timer to 2 seconds and starts the same. The CPU 21 thereafter checks if there is a signal from the one-frame feed switch SW7 in a step C8. If the one-frame feed switch SW7 remains turned on, then in step C10 it is ascertained whether the safety timer set to 2 seconds has timed out. If the safety timer has not timed out, then the control sequence returns to the step C8. If the one-frame feed switch SW7 is turned off in the step C8, then the control sequence proceeds to a step C9 in which the count of the exposure counter is decremented by 1 to display the sum on the exposure counter indicator 7 and the indicator elements 51 through 54 of the film transport indicator 5 are successively energized. The control sequence then returns from the step C9 to the step C7. If the time-out of the safety timer is reached in the step C10, then step C11 is performed, in which "E" is displayed on the exposure counter indicator 7, the film transport indicator 5 and the take-up spool indicator 6 are de-energized, and the motor driver circuit 22 is controlled to de-energize the film transport motor M. As the film end is approached, the exposure counter indicator 7 displays "4", "3", "2", "1", "0", "0", "0", "E", successively. The display "0", "0", "0" corresponds to the length of the film 26 which was initially fed in the automatic film loading process.

In the event that the film is not moved during an initial period of the film rewinding process because of loosening of the film in the cartridge, the one-frame feed switch SW7 may not be turned off. Such a condition tends to occur particularly when the film is to be manually rewound before it is fully exposed. Since the safety timer is initially set to 40 seconds in the film rewinding process, however, this condition is prevented from being erroneously detected as a film rewinding completion. The routine in which the safety timer is set to 10 seconds is included for the purpose of avoiding the detection of a film rewinding completion when the film rewinding process exceeds 2 seconds due to a low-temperature environment. Therefore, the step C6 may ascertain whether or not the count of the exposure counter is "0". The signal from the one-frame feed switch SW7 may be produced by reading a signal from a perforation switch directly with a photocoupler, for example, and frequency-dividing the read signal by 8.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for controlling film transport in a camera, comprising:
   a film transport motor for transporting a film;
   an alarm;
   signal generating means for intermittently generating a signal in timed relation to movement of the film; and
   control means responsive to the signal supplied from said signal generating means for controlling the film transport motor to wind or rewind the film, for energizing said alarm to give a film rewinding failure warning if a predetermined number of signals are not supplied by said signal generating means within a preset period of time from the time when the film starts being rewound, and for regarding, as a film rewinding completion time, the time when signals are no longer applied by said signal generating means for a predetermined period of time if at least a predetermined number of signals are applied by said signal generating means when the film starts to be rewound.

* * * * *